United States Patent [19]

Barrineau, Sr. et al.

[11] Patent Number: 4,638,828
[45] Date of Patent: Jan. 27, 1987

[54] WATER TEMPERATURE ACTUATED DRIP VALVE

[76] Inventors: Wyman L. Barrineau, Sr., 20 Loring Pl.; Julius P. Barrineau, 944 Morningside Dr., both of, Sumter, S.C. 29150

[21] Appl. No.: 790,065

[22] Filed: Oct. 22, 1985

[51] Int. Cl.[4] .................... F16K 17/00; G05D 23/02
[52] U.S. Cl. ......................... 137/62; 60/527; 137/79; 138/27; 236/100; 237/80; 251/11
[58] Field of Search ............... 137/59, 60, 61, 62, 137/79; 60/527; 138/27, 28, 32; 236/100; 237/80; 251/11

[56] References Cited

U.S. PATENT DOCUMENTS

| | | | |
|---|---|---|---|
| 3,369,556 | 2/1968 | Allderdice | 137/79 |
| 3,380,464 | 4/1968 | Arterbury et al. | 137/60 |
| 3,446,226 | 5/1969 | Canterbury | 137/62 |
| 4,066,090 | 1/1978 | Nakajima et al. | 137/62 |
| 4,205,698 | 6/1980 | Hucks | 137/62 |
| 4,296,770 | 10/1981 | Rice | 137/62 |
| 4,437,481 | 3/1984 | Chamberlin et al. | 137/62 |
| 4,454,890 | 6/1984 | Schoenheimer et al. | 137/62 |

Primary Examiner—George L. Walton
Attorney, Agent, or Firm—James B. Middleton

[57] ABSTRACT

An automatically operated valve to prevent freezing of water lines. The valve is elongated, having threads on one end to be received in a conventional plumbing tee or the like, or in a threaded opening in a faucet. The opposite end discharges water during dripping, and has a nipple to receive a hose to divert the waste water. A temperature sensitive device is in contact with the water, and includes a tip that projects at high temperatures and retracts at near-freezing temperatures. A plunger in the elongate valve is moved to close a valve when the tip is projected, and a spring within the drip valve urges the plunger to open the valve when the tip is retractable. The temperature sensitive device is carried by the drip valve by mating threads so the position of the temperature sensitive device can be varied through the threaded engagement.

4 Claims, 5 Drawing Figures

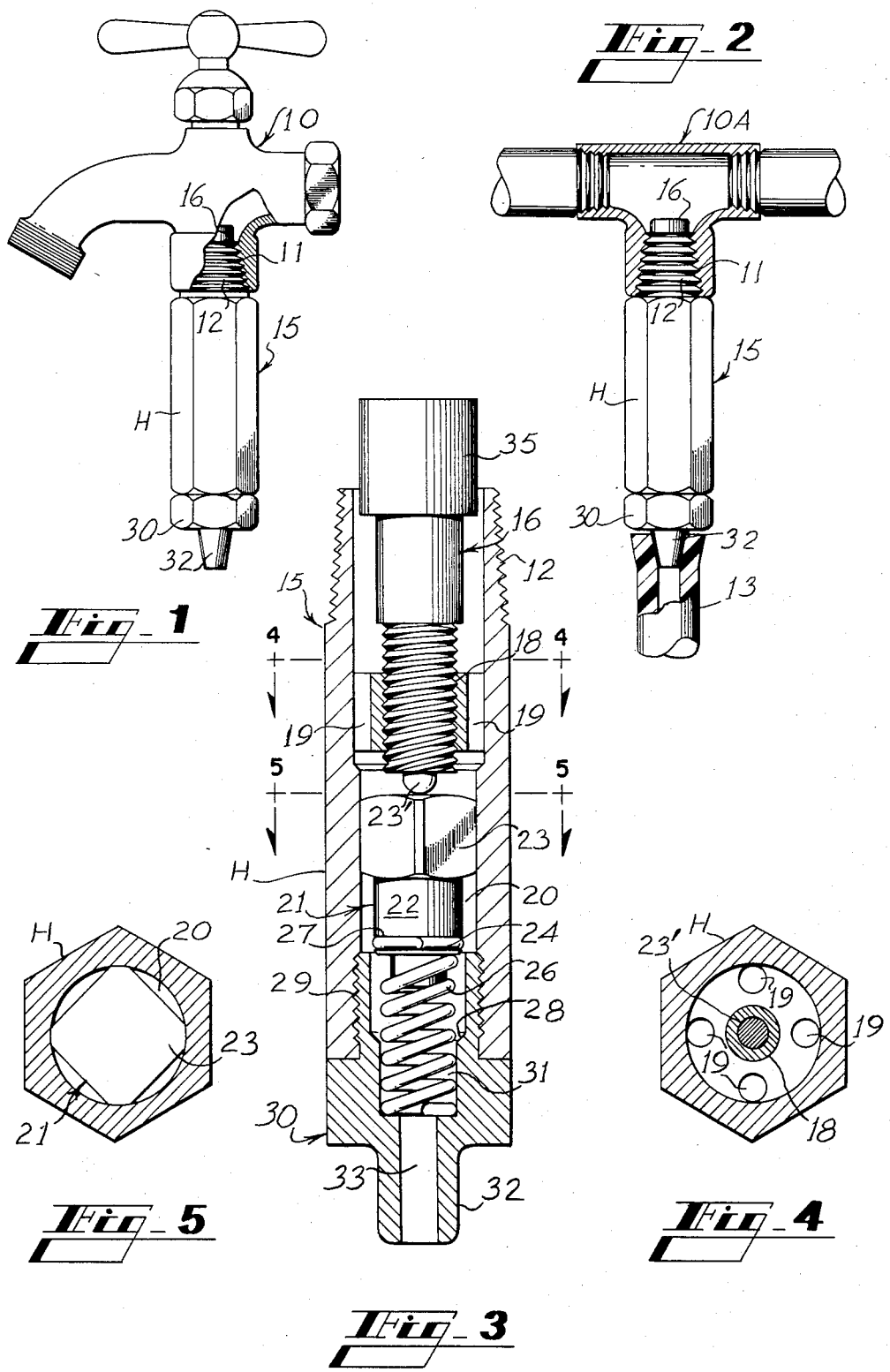

WATER TEMPERATURE ACTUATED DRIP VALVE

INFORMATION DISCLOSURE STATEMENT

Freezing of exposed water pipes is well known and is particularly troublesome in parts of the world where severe freezing is sufficiently infrequent that the housing or plumbing design does not use complete thermal protection. In such areas, the most common problem is the freezing of external water faucets and water pipes to which they are attached. This freezing is by no means limited to exposed faucets and can occur in any unprotected water pipe exposed to freezing temperatures. Rupture during a freeze, followed by melting after the freeze, causes not only damage, but also a waste of water from the broken valve and/or piping. A common preventive measure is to manually open the valve to a dripping level during potentially freezing weather. This works satisfactorily in that the temperature of the household water is sufficient to prevent freezing of the valve and/or its piping. However such an operation requires that one know of an oncoming freezing period and that one remember to open and close the valve. Additionally, if the owners are away from home when the freezing occurs, this common preventive measure is impossible and the resultant damage occurs.

Numerous freeze protection devices are known in the prior art. Representative of these devices are the following patents together with a discussion of each device proposed in the patents.

U.S. Pat. No. 1,134,822 to Lowe illustrates an early system approach to the problem of water pipe freezing wherein a valve is configured to respond to a pressure drop, the drop resulting from the constriction of water pressure created by a self contained thermal sensing loop within the water pipe as it enters the house.

U.S. Pat. No. 1,200,928 to Egan illustrates an early freeze release valve construction which depends on an aneroid spring mechanism and requires manual resetting after a lever has opened the water line to a bleed position.

U.S. Pat. Nos. 1,526,718 and 1,558,276 to Opp and Cartwright respectively, show further water draining devices, and particularly integral valving mechanisms. In Opp, the valve member must be opened against the water pressure, so that drained water is insured to freely surround the piston which is then moved by the expansion of the water in a separate chamber. Cartwright shows a container with a valve which will allow release of liquid from the container in response to a freeze. Cooling fluid from the container is allowed to freeze in an exterior region, and then simply lifts the valve to relieve the pressure.

U.S. Pat. No. 1,916,038 to Managhan illustrates a valve construction which is dependent upon the fracturing of a glass bottle under freeze conditions. Managhan illustrates a one-shot device wherein replacement of a glass bottle is required each time there has been a freeze. U.S. Pat. No. 3,320,965 to Morgan illustrates a freeze protection dump valve construction which is configured to respond to the combined conditions of lowered line pressure and subfreezing ambient temperature. Consequently, Morgan requires that the valve close whenever line pressure is greater than, for example, 10 psi, despite any state of contraction for the ambient temperature responsive bellows he employs.

U.S. Pat. No. 3,369,556 to Allderdice illustrates a freeze device having a single bellows filled with a liquid fluid, such as water. Expansion of the fluid in a freeze condition will move a valve off its seat in a direction against the water pressure within a water line. Allderdice requires his device to be mounted vertically, and in line with respect to the household plumbing, with by-pass water passing upwardly, through the device, to an ultimate discharge. It stays totally open whenever the ambient temperature is 32° F. or below. Finally, the Allderdice device also requires a lost motion adjustment to ensure actuation, in compensation for its permanency and summer weather.

U.S. Pat. No. 3,380,464 to Arterbury et al. illustrates an elongated housing which includes an annular expansion chamber, and further, a valve member which is hollowed to allow by-pass water to flow through the valve member to an ultimate discharge. Arterbury requires that his longitudinally moveable valve member be constructed so that by-pass water will have a heat transfer effect upon the expansion chamber volume. For this purpose, Arterbury requires that a portion of the valve member extend into the household water path in order to ensure that the thermal response of the expansion chamber is dependent upon the temperature of the household water supply.

U.S. Pat. No. 3,397,711 to Strange illustrates a device for releasing water to prevent freezing, wherein contraction of a thermally responsive element opens the drip valve. The valving activator in this device is a series of wafers configured to have a negative coefficient of thermal expansion in the vicinity of 32° F. The disclosure teaches an external screw adjustment in order to insure valve actuation, and the need for impinging by-pass water directly upon the wafer assembly so as to override a contraction of the wafer due to ambient temperature.

In U.S. Pat. No. 3,446,226 to Canterbury, valve actuation is accomplished by a block of material which contracts on lowered temperatures, thereby operating a disc valve controlling water flow through an orifice.

U.S. Pat. No. 3,880,180 to Wisner teaches a water pipe freeze valve which employs a floating piston within an extending housing, whereby expansion of water within the housing raises the piston and snaps open a valve, which then opens a separately spaced drain tube. The device requires that the piston have a port so that household water from above the piston will be available to fill his expansion fluid volume.

U.S. Pat. No. 4,066,090 to Nakajima et al. illustrates a recent patent relating to a water cock having an integrally mounted non-freezing valve. This device operates on the principle of bringing warmer line water up to the valve. The cock has a thermo-element sensing the surrounding water temperature and driving the non-freezing valve to open and close according to the temperature. The thermo-element consists of a base portion containing heat sensitive material, a cylinder containing jelly-like material, and a cylinder for transferring the expanding force of the heat sensitive jelly-like material to a shaft buried in the material, the shaft then operating the valve.

U.S. Pat. No. 4,205,698 to Hucks involves the use of a fluid having a negative coefficient of expansion with reduced temperature, with the volumetric change being a gradual change related to temperature rather than being activated at a given desirable temperature. Also, this valve is dependent upon a spring and several seals.

If the seal leaks between the chamber, water will flow into the intermediate space, freeze, and make the entire valve inoperable. This valve further requires that the bleed water be diverted from the valve in order not to interfere with sensing of true ambient temperature.

U.S. Pat. No. 4,437,481 to Chamberlin et al. involves attachment to the end of a water faucet necessitating removal from said water faucet thus interfering with normal use of the water faucet. The temperature sensing device is mounted down stream of the valve mechanism and appears to operate more on ambient temperature than water temperature.

SUMMARY OF THE INVENTION

This invention relates generally to freeze protection apparatus, and is more particularly concerned with an automatic drip valve operable at near-freezing water temperature.

The present invention provides a self-actuating drip valve for attachment to a specially modified water faucet or standard "tee" type plumbing fitting for the prevention of freezing of exposed water pipes. An elongated housing includes means for securing one end of the housing to the faucet or "tee" fitting. A temperature monitoring means is mounted within the housing in contact with the water. At appropriate temperatures, the monitoring means operates a plunger which opens and closes a valve to effect water flow.

BRIEF DESCRIPTION OF THE DRAWINGS

These and other features and advantages of the present invention will become apparent from consideration of the following specification when taken in conjunction with the accompanying drawings in which:

FIG. 1 is an elevational view of one embodiment of the invention in place on a specially modified water faucet, partially broken away;

FIG. 2 is an elevational view of the valve shown in FIG. 1 installed in a conventional "tee" type plumbing fitting which is shown in cross-section;

FIG. 3 is an enlarged, longitudinal cross-sectional view of the valve shown in FIGS. 1 and 2 with the valve in the open position;

FIG. 4 is a cross-sectional view taken along the line 4—4 of FIG. 3; and,

FIG. 5 is a cross-sectional view taken along the line 5—5 of FIG. 3.

DETAILED DESCRIPTION OF THE EMBODIMENT

Referring now more particularly to the drawings, and to that embodiment of the invention here chosen by way of illustration, FIG. 1 shows a water faucet 10 with the lower portion modified to include female threads 11 to accommodate the male threads 12 of the valve 15. The temperature sensing portion of the valve is located very near the stream of flow through the faucet 10 and does not interfere with the normal operation of the water faucet 10. FIG. 2 shows the valve 15 threaded into a standard "tee" type plumbing fitting 10A. The temperature sensing portion of the valve 15 is again located very near the stream of flow, and FIG. 2 also shows a small diameter hose 13 attached to divert the water when the valve 15 is open.

The components of the system, with the exception of the thermostatic monitoring device and the O-ring, may be machined from brass, though those skilled in the art will realize that numerous other materials will work quite well. The drip valve 15 includes an elongated housing H having therein an axial threaded hole 18 with additional holes 19 radially spaced therefrom. The holes 19 provide passage means for water to flow through the housing H, and the threaded hole 18 provides a means for adjustably mounting the monitoring device 16.

The housing H defines a lower axial bore 20, which receives a plunger 21. The plunger 21 has a square head 23 with rounded edges, so the plunger 21 moves freely in the bore 20. This plunger and bore arrangement allows water to flow past the plunger to the actual valve seat 28 of the device. Immediately below the square portion 23 the plunger is machined to a slightly smaller, round section 22, the lower part of which contains a groove 27 retaining an O-ring 24. The round section 22 with the O-ring 24 constitutes the movable valve member, and it provides a seal when it is seated at the shoulder, or valve seat, 28. Just below the groove 27 of the plunger 21, the plunger is again reduced to a smaller diameter to provide a means for receiving one end of a spring 26. It will be noted that the spring 26 maintains upward pressure on the plunger 21 to keep the valve open against the water pressure.

The lowermost end of the housing H as illustrated in FIG. 3 contains female threads 29 into which a male threaded seat assembly 30 is attached.

The upper portion of the seat assembly 30 is sized to receive the O-ring area of the plunger 21, and to allow the O-ring to extend to a shoulder 28 which provides a seat for the O-ring 24; thus, a valve seat is provided. Immediately below the valve seat 28, the seat assembly 30 is smaller, and is just sufficient to receive the spring 26. This opening extends to a distance beyond the shoulder 28 to provide containment 31 for the compressed spring when the valve is closed. Immediately below the spring containment 31 of the seat assembly 30, the interior opening is smaller to provide an outlet for the water to drip from. The lower portion of the seat assembly 30 is machined on the exterior to provide a nipple 32 for connection to a small diameter hose such as the hose 13.

When the water temperature falls to freezing levels, a waxlike substance in the upper portion 35 of the temperature monitoring device 16 contracts causing the tip 23' of the temperature monitor 16 to retract. The temperature monitoring device is axially adjusted by screwing it up or down in the threaded opening 18 depending upon the desired temperature at which one chooses the valve to open. Water with high ionic concentrations will freeze at lower temperatures than distilled water. The temperature monitoring device 16 well known to those skilled in the art, so the foregoing description should be sufficient.

The tip of the temperature monitoring device 16 provides the upper limits of travel for the plunger 21 which is forced upward by the spring 26. As the tip 23' retracts, the spring 26 pushes the plunger 21 up, lifting the O-ring 24 from its seat 28 and allowing water to flow through the opening 33 at the bottom of the device.

As the warmer water flows past the sensing portion 35 of the thermostatic expansion device 16, the tip 23' extends to push the plunger downward and urge the O-ring 24 against its seat 28 to close the valve.

It will now be obvious that the present invention provides a significant improvement over prior art automatic valves due to its simple construction, the fact that the temperature sensing mechanism is located near or in the flow of water, and the allowing of normal plumbing operation with the valve installed.

It is to be understood that the above description and drawings are illustrative only, since various components could be modified without departing from the invention. For example, the upper portion of the plunger 21 could be of different geometric shapes, e.g. a hexagon or other non-circular shape. Other modifications are also possible without departing from the invention, the scope of which is to be limited only by the following claims.

We claim:

1. A self actuating drip valve in combination with a water pipe for preventing freezing of water in said water pipe, said drip valve comprising an elongate housing defining an opening therethrough, a portion of said opening including a central threaded hole, and a plurality of additional holes radially outward of said threaded hole, a temperature sensing means received within said opening at one end thereof for being contacted by said water in said water pipe, said temperature sensing means including an externally threaded end threadedly engaged with said central threaded hole, a tip projectable at high temperatures and retractable at near-freezing temperatures, a plunger within said opening in said housing and located to be directly and adjustably engaged by said tip for urging said plunger downwardly, said plunger including a head slidable within said opening, said head having flat faces for defining water passages between said flat faces and said opening, a round section below said head, said round section having a smaller diameter than the diameter of said opening, and a sealing means at the lower end of said round section, a seat assembly received within said opening of said housing, said seat assembly including a bore for receiving said round section of said plunger with said sealing means, a valve seat defined within said bore, and a spring held by said seat assembly for urging said plunger upwardly, said valve seat being selectively engageable by said sealing means, said additional holes allowing water flow through said housing adjacent to said temperature sensing means, said plunger allowing water flow through said opening in said housing to said sealing means, the arrangement being such that engagement of said sealing means with said valve seat prevents water flow through said housing, and motion of said sealing means towards and away from said valve seat allows varying water flow which is dependent upon the direct and adjustable engagement between said tip and said plunger.

2. A self actuating drip valve as claimed in claim 1, said water pipe further including a faucet defining a threaded opening located adjacent to the valve of said faucet and in communication with said water pipe.

3. A self actuating drip valve as claimed in claim 1, said sealing means comprising an O-ring carried by said plunger, said seat assembly being removably secured to said housing.

4. A self actuating drip valve as claimed in claim 3, said seat assembly defining an opening therethrough for allowing passage of water, and including a nipple for receiving a hose.

* * * * *